(12) United States Patent
Zheng (10) Patent No.: US 11,870,953 B2
(45) Date of Patent: Jan. 9, 2024

(54) DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Bingwen Zheng, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 323 days.

(21) Appl. No.: 17/432,082

(22) PCT Filed: Jun. 24, 2021

(86) PCT No.: PCT/CN2021/102014
§ 371 (c)(1),
(2) Date: Aug. 18, 2021

(87) PCT Pub. No.: WO2022/246940
PCT Pub. Date: Dec. 1, 2022

(65) Prior Publication Data
US 2023/0224412 A1    Jul. 13, 2023

(30) Foreign Application Priority Data

May 26, 2021 (CN) .......................... 202110577773.6

(51) Int. Cl.
*H04N 1/00* (2006.01)
*G06F 3/0354* (2013.01)
*G06F 3/041* (2006.01)

(52) U.S. Cl.
CPC ..... *H04N 1/00129* (2013.01); *G06F 3/03545* (2013.01); *G06F 3/0412* (2013.01)

(58) Field of Classification Search
CPC ...... G06F 3/0412; G06F 3/041; G06F 3/0354; G06F 3/038; G06F 3/03545; H04N 1/00129
(Continued)

(56) References Cited

U.S. PATENT DOCUMENTS 5,708,515 A * 1/1998 Nishiura ............ H04N 1/00129
358/473
8,670,027 B1 * 3/2014 Schaffer .................. G06F 3/038
348/61

(Continued)

FOREIGN PATENT DOCUMENTS

AU   2012264497 A1   12/2013
CN     101335828 A   12/2008
(Continued)

OTHER PUBLICATIONS

PCT International Search Report for International Application No. PCT/CN2021/102014, dated Feb. 24, 2022, 8pp.
(Continued)

*Primary Examiner* — Pritham D Prabhakher
(74) *Attorney, Agent, or Firm* — The Roy Gross Law Firm, LLC; Roy Gross (57) ABSTRACT

The present invention relates to a display device, and a camera module of the present invention is detachably connected to an outer edge of a display device main body without disposing the camera module before the display device main body is disposed, such that no aperture needs to be formed in a display region of a display screen of the display device main body to make the display device main body achieve real full screen.

8 Claims, 8 Drawing Sheets

(58) Field of Classification Search
USPC ...................................................... 348/207.1
See application file for complete search history.

(56) References Cited

U.S. PATENT DOCUMENTS

| | | | | |
|---|---|---|---|---|
| 9,753,555 | B2* | 9/2017 | Lee | G06F 3/04883 |
| 11,048,346 | B1* | 6/2021 | Burks | G06F 1/1616 |
| 11,126,280 | B2* | 9/2021 | Bakema | G06F 3/038 |
| 11,301,063 | B2* | 4/2022 | King, Jr. | G06V 30/32 |
| 11,340,717 | B2* | 5/2022 | Liu | G06F 1/1632 |
| 2009/0256955 | A1* | 10/2009 | Kuo | H04M 1/0264 |
| | | | | 455/556.1 |
| 2014/0125606 | A1* | 5/2014 | Namkung | G06F 1/169 |
| | | | | 345/173 |
| 2016/0188011 | A1 | 6/2016 | Lee et al. | |
| 2018/0292866 | A1* | 10/2018 | Tucker | G06F 1/1694 |
| 2019/0265808 | A1 | 8/2019 | Zhang et al. | |
| 2020/0412853 | A1 | 12/2020 | Zhu et al. | |
| 2021/0124434 | A1* | 4/2021 | Bakema | G06F 3/038 |
| 2021/0155030 | A1* | 5/2021 | Kurani | G06F 3/016 |
| 2021/0200340 | A1* | 7/2021 | Burks | G06F 1/1616 |

FOREIGN PATENT DOCUMENTS

| | | |
|---|---|---|
| CN | 104820567 A | 8/2015 |
| CN | 105791648 A | 7/2016 |
| CN | 108243303 A | 7/2018 |
| CN | 108551504 A | 9/2018 |
| CN | 108881567 A | 11/2018 |
| CN | 110049222 A | 7/2019 |
| CN | 110602287 A | 12/2019 |
| CN | 110798616 A | 2/2020 |
| CN | 111314593 A | 6/2020 |
| CN | 211702183 U | 10/2020 |
| CN | 112073559 A | 12/2020 |
| CN | 112584004 A | 3/2021 |
| JP | 2020021227 A | 2/2020 |
| KR | 20030035305 A | 5/2003 |
| KR | 20150049293 A | 5/2015 |

OTHER PUBLICATIONS

PCT Written Opinion of the International Searching Authority for International Application No. PCT/CN2021/102014, dated Feb. 24, 2022, 8pp.
Chinese Office Action issued in corresponding Chinese Patent Application No. 202110577773.6 dated Oct. 26, 2021, pp. 1-8, 16pp.
Chinese Office Action issued in corresponding Chinese Patent Application No. 202110577773.6 dated May 5, 2022, pp. 1-6, 16pp.
Chinese Office Action issued in corresponding Chinese Patent Application No. 202110577773.6 dated Sep. 2, 2022, pp. 1-5, 12pp.
Chinese Decision of Rejection issued in corresponding Chinese Patent Application No. 202110577773.6 dated Jan. 28, 2023, pp. 1-5, 12pp.
Korean Office Action issued in corresponding Korean Patent Application No. 10-2021-7035443 dated Feb. 20, 2023, pp. 1-6, 12pp.
Russian Office Action issued in corresponding Russian Patent Application No. 202291053 dated Apr. 4, 2023, pp. 1-2, 4pp.
Japanese Office Action issued in corresponding Japanese Patent Application No. 特願 2021-564516 dated Jul. 25, 2023, pp. 1-6.

* cited by examiner

DISPLAY DEVICE

CROSS REFERENCE TO RELATED APPLICATIONS

This application is a National Phase of PCT Patent Application No. PCT/CN2021/102014 having International filing date of Jun. 24, 2021, which claims the benefit of priority of Chinese Application No. 202110577773.6 filed May 26, 2021. The contents of the above applications are all incorporated by reference as if fully set forth herein in their entirety.

FIELD OF INVENTION

The present application relates to a field of display technologies, especially to a display device.

BACKGROUND OF INVENTION

A display device refers to an information display device using electronic technologies to turn an imperceptible signal into a perceptible signal. The display device has advantages of small size, flexible display format, and comprehensive display of multiple information at the same time.

With continuous development of technologies, appearances and functions of display devices are constantly innovating and upgrading. A screen ratio is an important indicator of screens of the display devices. An increase in the screen ratio can provide people with an excellent visual experience and interactive effects. To improve a visual effect to allow users to feel more immersive, people set forth higher requirements for the screen ratio of the display devices. Therefore, a full screen display device has also entered people's field of vision.

SUMMARY OF INVENTION

Technical Issue

With popularization of a concept of full screen, to improve a screen ratio, under-screen camera, water droplet screen, in-screen openings, and other display technologies have been gradually developed. However, the water droplet screens, the in-screen openings, etc. destroy the integrity of the screen and are not true full screens. The conventional technology of under-screen-camera solutions is immature. Visual differences are between a camera area and other areas due to design issues, and an imaging effect is poor and a production yield is low. Therefore, how to provide a full screen display device that does not occupy a screen space and can complete a photo or video function is an issue that need to be solved urgently by a person of ordinary skill in the art.

Technical Solution

An objective of the present invention is to provide a display device that can solve an issue that a conventional display device cannot have both a front camera function and a full screen effect.

To solve the above issue, the present invention provides a display device comprising: a camera module comprising a lens configured to acquire an image; a first assembly comprising: a first communication unit; and a first control module connected to the first communication unit; and a second assembly configured to control the camera module, wherein the second assembly comprises: a display screen configured to display the image acquired by the lens; a second communication unit configured to connect with the first communication unit in wireless communication; and a second control module connected to the display screen and the second communication unit; wherein the camera module is detachably installed on an outer edge of the first assembly or an outer edge of the second assembly.

Furthermore, the display screen is a touch panel configured to receive at least one control instruction; and the second control module is configured to transmit the control instruction to the camera module.

Furthermore, when the camera module is detachably installed on the outer edge of the first assembly, the second control module is configured to transmit the control instruction to the second communication unit, the second communication unit transmits the control instruction to the first communication unit, the first communication unit transmits the control instruction to the first control module, and the first control module transmits the control instruction to the camera module.

Furthermore, when the camera module is detachably installed on the outer edge of the second assembly, the second control module directly transmits the control instruction to the camera module.

Furthermore, the first assembly is a stylus comprising a first socket; the second assembly is a display device main body and comprises a second socket; and the camera module comprises a first connector, and the first connector is unpluggably connected to the first socket or the second socket.

Furthermore, the first socket and the second socket are Type-C sockets, and the first connector is a Type-C connector.

Furthermore, the second assembly comprises a casing and an accommodation cavity is defined in the casing; and the first assembly is detachably installed in the accommodation cavity.

Furthermore, the first assembly comprises a power input electrical contact; the second assembly comprises a power output electrical contact disposed in the accommodation cavity; and when the first assembly is installed in the accommodation cavity, and a power input electrical contact is electrically connected to the power output electrical contact.

Furthermore, the first socket and the power input electrical contact are disposed on two ends of the first assembly respectively.

Furthermore, the first assembly comprises a magnetic element configured to magnetically attach the first assembly to the second assembly.

Advantages

The present invention relates to a display device. A camera module of the present invention is detachably connected to the outer edge of the display device main body without disposing a camera module before the display device main body is disposed, such that no aperture needs to be formed in the display region of the display screen of the display device main body to make the display device main body achieve real full screen. In the present invention, a user can hold the camera module by a hand to adjust a direction of a lens of the camera module at will for taking a photograph at multiple angles. When the user takes a photograph, even if the display device for inputting shutter instructions shakes, stability of the camera module can be completely unaffected and the camera module can still photograph a clear image.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

Reference Character Indication:
100, display device
1, camera module; 2, first assembly
3, second assembly
11, lens; 12, first connector
21, first communication unit; 22, first control module
23, first socket; 24, power input electrical contact
25, magnetic element
31, casing; 32, display screen
33, second socket; 34, second communication unit
35, second control module
311, accommodation cavity.

DETAILED DESCRIPTION OF PREFERRED EMBODIMENTS

Preferred embodiments of the present invention are described with accompanying drawings as follows introduce a person of ordinary skill in the art the technical contents of the present invention completely such that examples are used to prove that the present invention can be embodied. As such the published technologies of the present invention are made clearer such that a person of ordinary skill in the art can better understand the way to embody the present invention.

The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention.

In the drawings, elements with the same structures are indicated with the same numerals, and elements with similar structures or functions are indicated with similar numerals. Furthermore, for convenience of understanding and description, the dimension and thickness of each assembly in the drawings are depicted at arbitrarily, and the present invention has no limit to the dimension and thickness of each assembly.

First Embodiment

Figure 1:
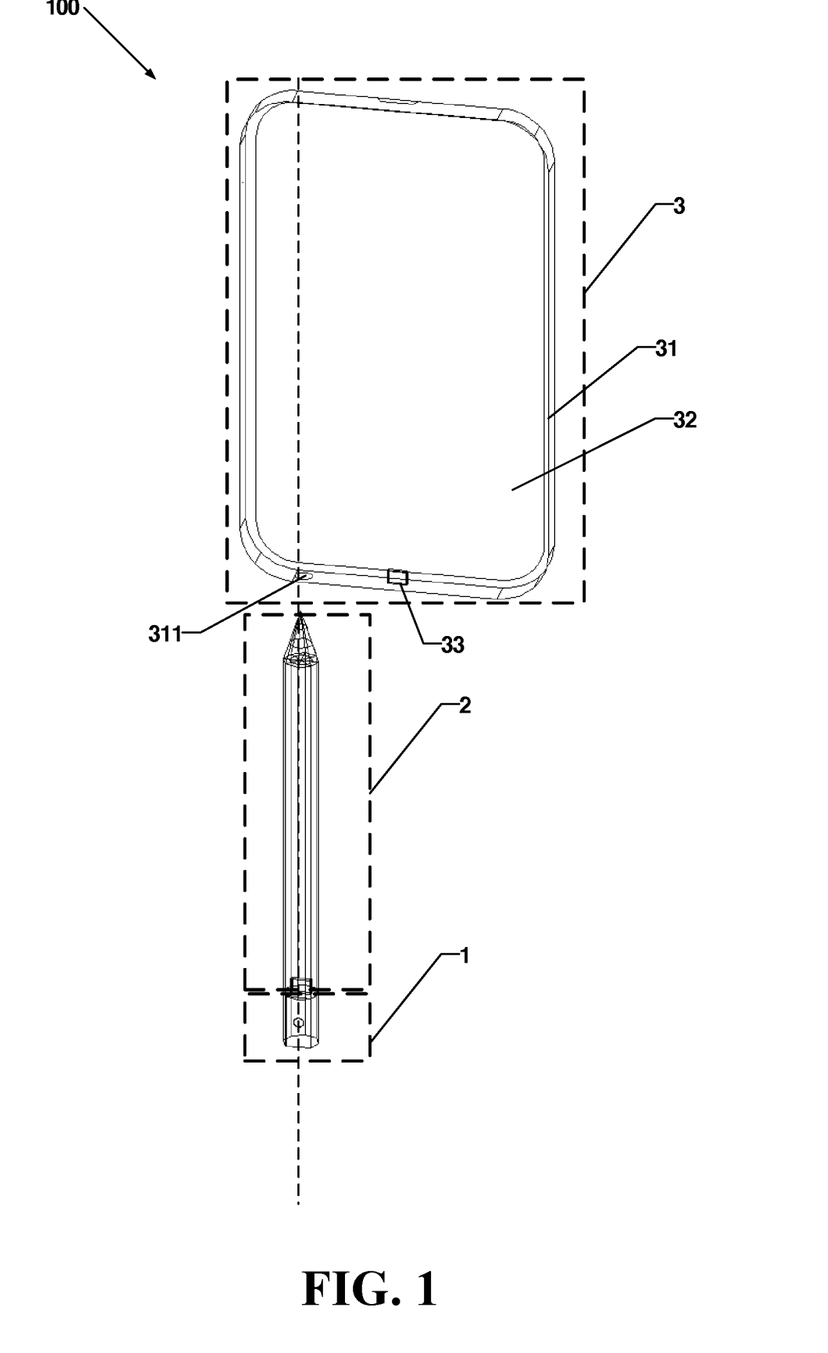
FIG. 1 is a schematic structural view of a display device of a first embodiment of the present invention.

With reference to FIG. 1, the present embodiment provides a display device 100 comprising: a camera module 1, a first assembly 2, and a second assembly 3.

Figure 2:
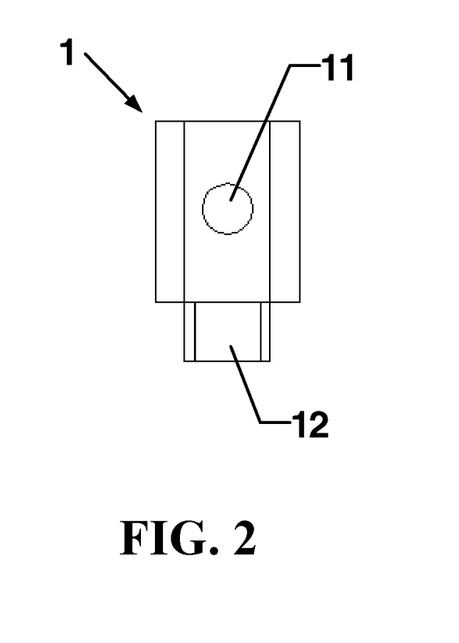
FIG. 2 is a schematic structural view of a camera module of the first embodiment of the present invention.

With reference to FIG. 2, the camera module 1 comprises a lens 11 and first connector 12. The lens 11 is configured to acquire an image. The first connector 12 in the present embodiment is configured to achieve charge/discharge and data transmission, and is preferably a Type-C connector. In other embodiment, the first connector 12 can employ a connector of other type such as a lighting connector, a mini-USB connector, etc.

Figure 6:
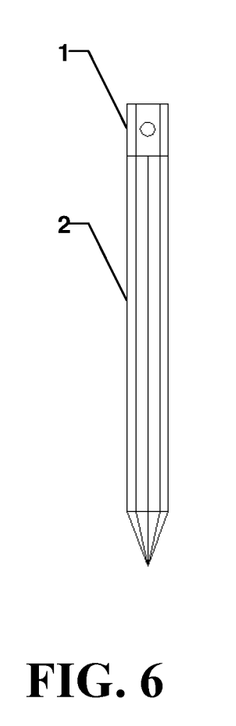
FIG. 6 is a schematic structural view of the camera module of the first embodiment of the present invention inserted into the first assembly.
Figure 7:
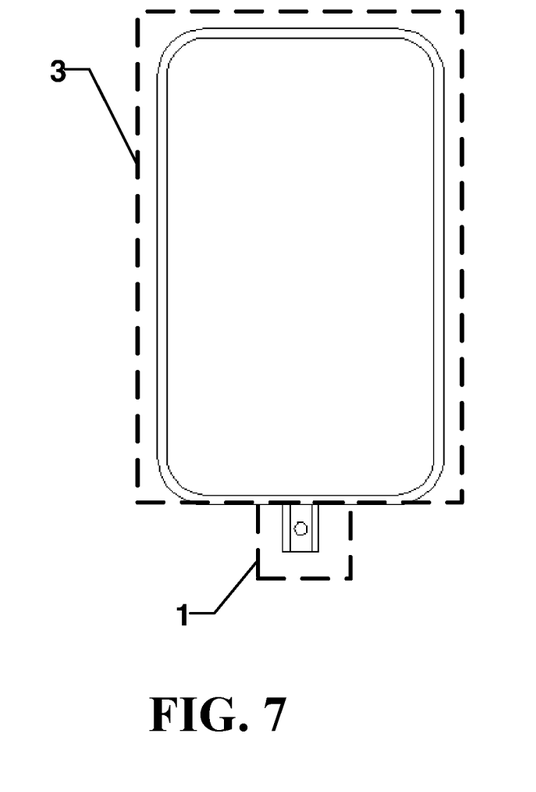
FIG. 7 is a schematic structural view of the camera module of the first embodiment of the present invention inserted into a second assembly.

With reference to FIGS. 6 and 7, the first connector 12 makes the camera module 1 detachably connected to an outer edge of the first assembly 2 or an outer of the second assembly 3. Namely, when the camera module 1 is detachably connected to the outer edge of the first assembly 2, only the first connector 12 of the camera module 1 extends into the first assembly 2, and other parts of the camera module 1 are located outside the first assembly 2. When the camera module 1 is detachably connected to the outer edge of the second assembly 3, only the first connector 12 of the camera module 1 extends into the second assembly 3, and other parts of the camera module 1 are located outside the second assembly 3.

Figure 3:
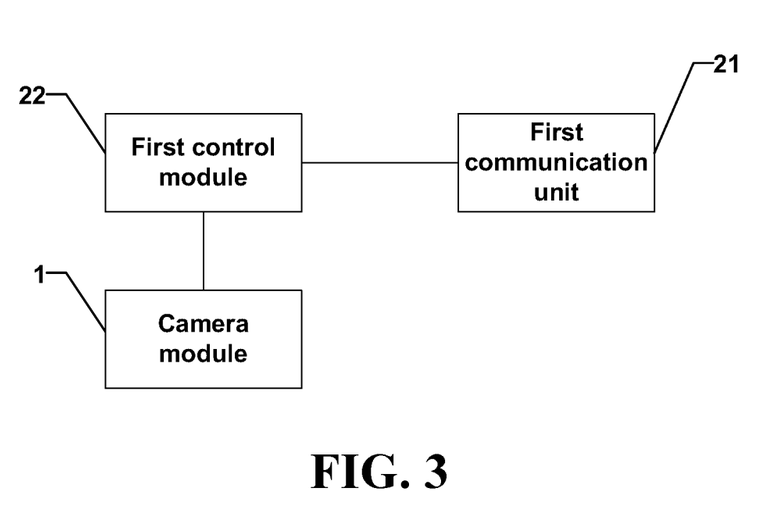
FIG. 3 is a schematic control view of a first control module of the first embodiment of the present invention.

With reference to FIG. 3, the first assembly 2 comprises: a first communication unit 21 and a first control module 22. The first control module 22 (processor) is connected to the first communication unit 21.

Figure 4:
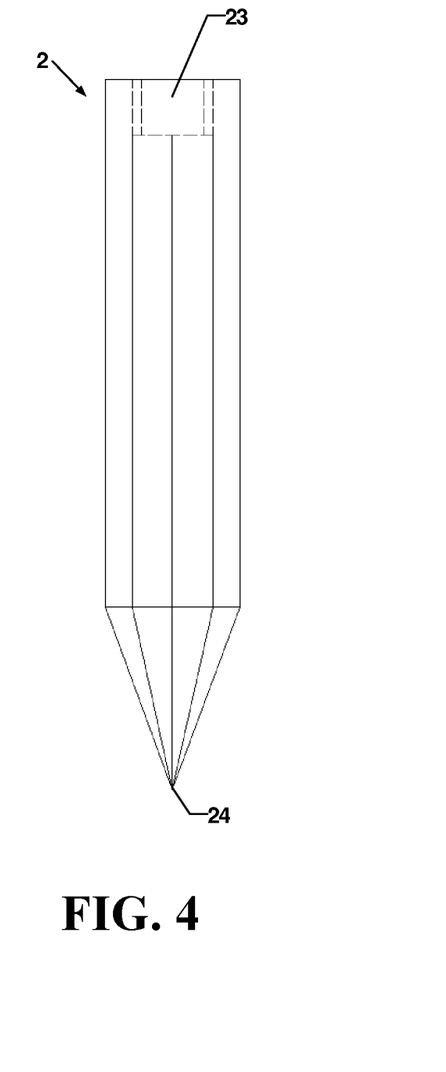
FIG. 4 is a schematic structural view of a first assembly of the first embodiment of the present invention.

With reference to FIG. 4, in the present embodiment, the first assembly 2 is preferably a stylus and comprises a first socket 23. In the present embodiment, the first socket 23 is preferably a Type-C socket. As such, the first connector 12 of the camera module 1 is unpluggably connected to the first socket 23.

With reference to FIG. 1, the second assembly 3 is a display device main body. The display device main body comprises one of cell phone, tablet, or laptop. In the present embodiment, the second assembly 3 is a cell phone.

The second assembly 3 comprises: a casing 31, a display screen 32, and a second socket 33. In the present embodiment, the second socket 33 is a Type-C socket. As such, the first connector 12 of the camera module 1 is unpluggably connected to the second socket 33. The display screen 32 is configured to display the image acquired by the lens 11. In the present embodiment, the display screen 32 is a touch panel. The display screen 32 is configured to receive at least one control instruction. The control instruction comprises a control instruction from a user, for example, instruction such as activating the camera module, photographing, switching working modes of the camera module, etc.

Figure 5:
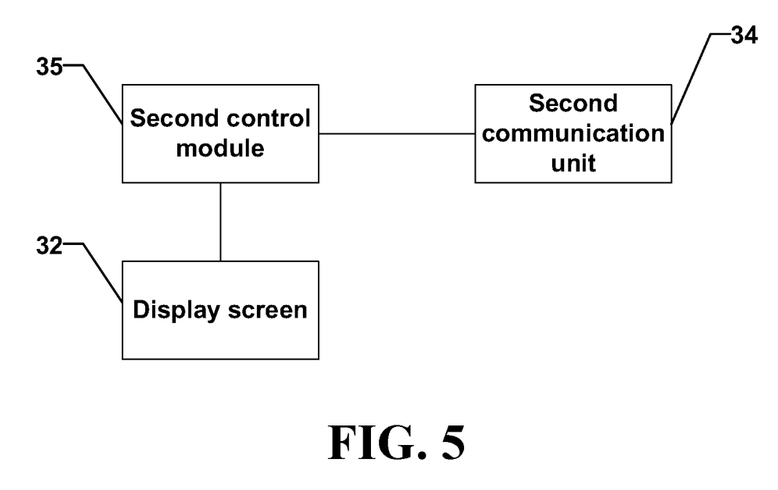
FIG. 5 is a schematic control view of a second control module of the first embodiment of the present invention.

With reference to FIG. 5, the second assembly 3 comprises: a second communication unit 34 and a second control module 35.

The second communication unit 34 is connected to the first communication unit 21 in wireless communication. In the present embodiment, the first communication unit 21 and the second communication unit 34 are matching wireless communication units, and preferably a set of Bluetooth communication devices to achieve real time communication between the first assembly 2 and the second assembly 3. In other embodiment, the first communication unit 21 and the second communication unit 34 can also employ other communication devices, for example, Wi-Fi communication devices.

The second control module 35 is connected to the display screen 32 and the second communication unit 34. The second control module 35 is mainly configured to control the camera module 1.

With reference to FIGS. 3 and 6, when the camera module 1 is detachably installed on the outer edge of the first assembly 2, the first control module 22 is also connected to the camera module 1 and is configured to control the camera module 1 to acquire an image.

When the camera module 1 is detachably installed on the outer edge of the first assembly 2, the second control module 35 transmits the control instruction to the camera module 1. Specifically, the second control module 35 transmits the control instruction to the second communication unit 34, and the second communication unit 34 transmits the control instruction to the first communication unit 21. The first communication unit 21 transmits the control instruction to the first control module 22, and the first control module 22 controls the camera module 1 to implement a control instruction.

With reference to FIG. 7, the camera module 1 can also be inserted into the second assembly 3. Specifically, the first connector 12 of the camera module 1 is unpluggably connected to the second socket 33. As such, even under a circumstance of the first assembly 2 having a low battery or damages, the camera module 1 can still be inserted into the second assembly 3 to perform works of acquiring an image. Specifically, when the camera module 1 is detachably installed on the outer edge of the second assembly 3, the second control module 35 directly transmits the control instruction to the camera module 1, and the camera module 1 implements a control instruction.

With reference to FIG. 1, an accommodation cavity 311 is defined in the casing 31. The first assembly 2 is detachably installed in the accommodation cavity 311. When it is not required to use the camera module 1, the first connector 12 of the camera module 1 can be inserted into the first socket 23 of the first assembly 2, and then the first assembly 2 with the camera module 1 can be accommodated in the accommodation cavity 311 to facilitate carrying, which can also prevent loss of the first assembly 2 and the camera module 1.

At the same time, in the present embodiment, the second assembly 3 further comprises a power output electrical contact (not shown in the figures). The power output electrical contact is disposed in the accommodation cavity 311.

With reference to FIG. 4, the first assembly 2 comprises a power input electrical contact 24. The first socket 23 and the power input electrical contact 24 are disposed at two ends of the first assembly 2 respectively. In the present embodiment, the power input electrical contact 24 is a penpoint of the active pen. When the first assembly 2 is installed to the accommodation cavity 311, the power input electrical contact 24 is electrically connected to the power output electrical contact, thereby charging the first assembly 2 through the second assembly 3. As such, the accommodation cavity 311 has both functions of accommodation and charging and charges the first assembly 2 when the first assembly 2 is installed to the accommodation cavity 311 without spending additional time to charge the first assembly 2, which is convenient to use.

The camera module 1 of the present embodiment is detachably connected to the outer edge of the first assembly 2 and the outer edge of the second assembly 3, such that there is no need to dispose the camera module 1 in the second assembly 3 and thus there is no need to define an aperture in the display screen 32 of the second assembly 3, which makes the display screen 32 of the second assembly 3 achieve a true full screen. In the present embodiment, a user can hold the camera module 1 by hand, such that a direction of the lens of the camera module 1 can be adjusted at will to perform multi-angle photographing. When a user takes a photograph, even if the second assembly 3 for inputting shutter instructions shakes, stability of the camera module 1 can be completely unaffected and the camera module 1 can still photograph a clear image.

Second Embodiment

Figure 8:
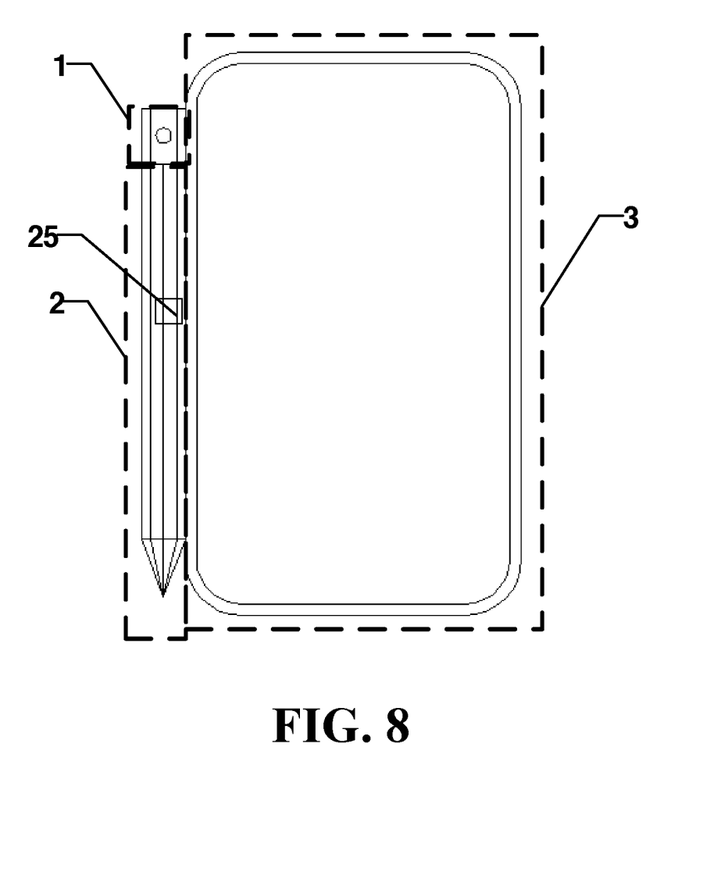
FIG. 8 is a schematic structural view of a display device of a second embodiment of the present invention.

With reference to FIG. 8, the present embodiment comprises most of the features of the first embodiment, and a difference of the present embodiment from first embodiment is as follows: The first assembly 2 in the present embodiment comprises: a magnetic element 25. The magnetic element 25 is configured to magnetically attach the first assembly 2 to the second assembly 3. Namely, when the camera module 1 and first assembly 2 are not needed, the first assembly 2 and the camera module 1 can be magnetically attached to the second assembly 3 to facilitate carrying, which can also prevent loss of the first assembly 2 and the camera module 1.

In the present embodiment, the first assembly 2 can be connected to an external power supply through the first socket 23 to charge the first assembly 2.

The camera module 1 of the present embodiment is detachably connected to the outer edge of the first assembly 2 and the outer edge of the second assembly 3, such that there is no need to dispose the camera module 1 in the second assembly 3 and thus there is no need to define an aperture in the display screen 32 of the second assembly 3, which makes the display screen 32 of the second assembly 3 achieve a true full screen. In the present embodiment, a user can hold the camera module 1 by hand, such that a direction of the lens of the camera module 1 can be adjusted at will to perform multi-angle photographing. When a user takes a photograph, even if the second assembly 3 for inputting shutter instructions shakes, stability of the camera module 1 can be completely unaffected and the camera module 1 can still photograph a clear image.

The display device provided by the present application is described in detail as above. In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:
1. A display device, comprising:
a camera module comprising a lens configured to acquire an image;
a first assembly comprising:
a first communication unit; and
a first control module connected to the first communication unit; and a second assembly configured to control the camera module, wherein the second assembly comprises:
a display screen configured to display the image acquired by the lens;
a second communication unit configured to connect with the first communication unit in wireless communication; and
a second control module connected to the display screen and the second communication unit;
wherein the camera module is detachably installed on an outer edge of the first assembly or an outer edge of the second assembly,
wherein the camera module is detachably installed on the outer edge of the first assembly, the second control module is configured to transmit a control instruction to the second communication unit, the second communication unit transmits the control instruction to the first communication unit, the first communication unit transmits the control instruction to the first control module, and the first control module transmits the control instruction to the camera module,
wherein the camera module is detachably installed on the outer edge of the second assembly, the second control module directly transmits the control instruction to the camera module.

2. The display device according to claim 1, wherein the display screen is a touch panel configured to receive the at least one control instruction; and
the second control module is configured to transmit the control instruction to the camera module.

3. The display device according to claim 1, wherein
the first assembly is a stylus comprising a first socket;
the second assembly is a display device main body and comprises a second socket; and
the camera module comprises a first connector, and the first connector is unpluggably connected to the first socket or the second socket.

4. The display device according to claim 3, wherein the first socket and the second socket are Type-C sockets, and the first connector is a Type-C connector.

5. The display device according to claim 3, wherein
the second assembly comprises a casing and an accommodation cavity is defined in the casing; and
the first assembly is detachably installed in the accommodation cavity.

6. The display device according to claim 5, wherein
the first assembly comprises a power input electrical contact;
the second assembly comprises a power output electrical contact disposed in the accommodation cavity; and
when the first assembly is installed in the accommodation cavity, and a power input electrical contact is electrically connected to the power output electrical contact.

7. The display device according to claim 6, wherein the first socket and the power input electrical contact are disposed on two ends of the first assembly respectively.

8. The display device according to claim 1, wherein the first assembly comprises a magnetic element configured to magnetically attach the first assembly to the second assembly.

* * * * *